G. W. Gregory,
Grapple.
Nº 57,125. Patented Aug. 14, 1866.
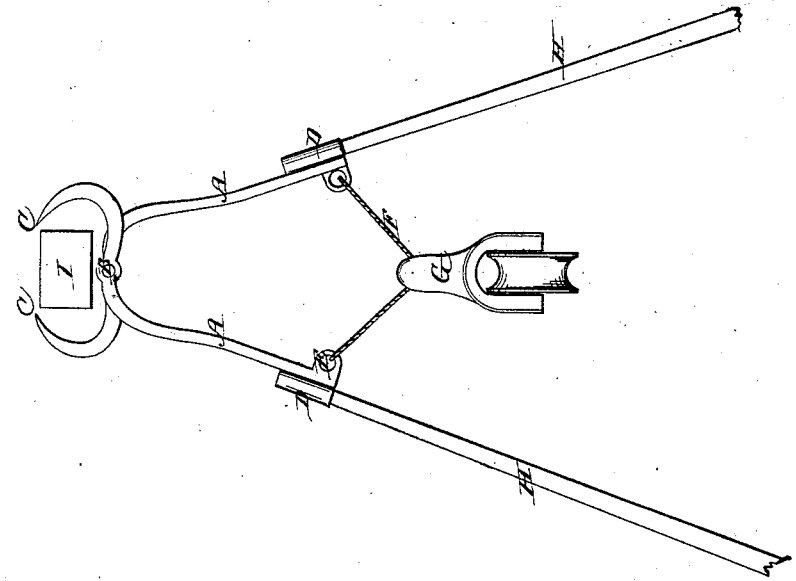
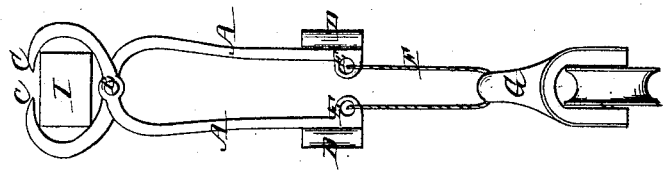
Witnesses
Inventor
Geo. W. Gregory

UNITED STATES PATENT OFFICE.

GEORGE W. GREGORY, OF BINGHAMTON, NEW YORK.

IMPROVEMENTS IN PULLEY ATTACHMENTS FOR RAISING WEIGHTS.

Specification forming part of Letters Patent No. 57,125, dated August 14, 1866; antedated February 14, 1866.

*To all whom it may concern:*

Be it known that I, GEORGE W. GREGORY, of Binghamton, Broome county, and State of New York, have invented certain new and useful Improvements in the Manner of Attaching Pulleys for Hay-Forks and other purposes to Beams or Rafters; and I do hereby declare that the following is a full, clear, and exact description thereof, reference being had to the annexed drawings, and to the letters of reference marked thereon, like letters indicating like parts, and in which—

Figure 1 is a perspective view of my grapple hooked on the beam and supporting a pulley, and Fig. 2 is a perspective view of the grapple opened and being hooked on the beam.

In operating hay-forks it is necessary that one of the pulleys shall hang over that portion of the bay where the hay is to be deposited, and in large barns it is necessary to change the position of this pulley from time to time in order to distribute the hay in all parts of the bay. Heretofore this pulley has either been supported by a screw-hook screwed into the beam or rafter, or by a cord or chain passed around the beam or rafter, and in both cases the operator, before using the fork, has been obliged to ascend in some manner into the peak of the barn and, with a bit, bore a hole for the hook and screw the hook therein, or pass a chain around the beam or rafter. To either the hook or the chain the pulley was then attached. This ascent must be made as often as it becomes necessary to change the pulley, and is often, in high barns, quite dangerous and always inconvenient.

My invention, therefore, consists in supporting the pulley or pulleys by means of a cord or chain attached to a grapple which is provided with sockets in which poles may be inserted and the grapple changed, by the operator standing below, from place to place, as may be desired, thus obviating the danger and inconvenience above stated.

In order to enable others to make and use my invention, I will proceed to describe its construction and operation.

The grapple is composed of two bent arms, A A, pivoted together at B, and having the part C C curved and pointed sufficiently to surround a beam or rafter or to fasten in its sides.

The part marked I is intended to represent a beam. The lower ends of arms A A are provided with suitable sockets and rings D E, the former to receive poles H H, by which the grapple is operated and changed from place to place, and the latter, to which the cord or rope F is attached that supports the pulley G. The chain or cord is first passed through the eye of the pulley. The chain is then fastened to eyes E, and poles are inserted in sockets D, and the grapple raised into the peak opened, and closed over the beam wherever desired. The poles may then be removed. The weight of the pulley and the weight of the fork and the cord passing over the pulley tend to keep hay on the grapple close to the beam.

I am aware that grapples have been constructed similar in their general appearance to the one shown by me; but none, so far as I am aware have been provided with a tube or socket and used for this purpose.

I do not therefore claim a grapple constructed as herein described, neither do I desire to confine myself to the precise construction herein described; but

What I claim, and desire to secure by Letters Patent, is—

The combination of the grapple and pulley, and the arrangement of the several parts whereby to facilitate the action and move the apparatus from place to place, substantially as and for the purpose herein set forth.

GEO. W. GREGORY.

Witnesses:
   JOHN S. HOLLINGSHEAD,
   JOHN D. BLOOR.